United States Patent
Kim et al.

(10) Patent No.: US 12,030,695 B2
(45) Date of Patent: Jul. 9, 2024

(54) INTERNAL TRAY FOR CONVEYING BATTERY CELLS AND TRAY FOR CONVEYING BATTERY CELL INCLUDING SAME

(71) Applicant: LG ENERGY SOLUTION, LTD., Seoul (KR)

(72) Inventors: Se Jong Kim, Daejeon (KR); Yun Sic Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 62 days.

(21) Appl. No.: 17/913,668

(22) PCT Filed: Nov. 25, 2021

(86) PCT No.: PCT/KR2021/017532
§ 371 (c)(1),
(2) Date: Sep. 22, 2022

(87) PCT Pub. No.: WO2022/131611
PCT Pub. Date: Jun. 23, 2022

(65) Prior Publication Data
US 2023/0111946 A1    Apr. 13, 2023

(30) Foreign Application Priority Data
Dec. 15, 2020    (KR) .................. 10-2020-0175324

(51) Int. Cl.
*B65D 85/30*    (2006.01)
*B65D 25/10*    (2006.01)

(52) U.S. Cl.
CPC .......... *B65D 25/107* (2013.01); *B65D 85/307* (2013.01); *B65D 2585/88* (2013.01)

(58) Field of Classification Search
CPC .... B65D 25/107; B65D 85/30; B65D 85/307; B65D 2585/88; H01M 50/211; H01M 50/242
(Continued)

(56) References Cited

U.S. PATENT DOCUMENTS 6,866,150 B2 *   3/2005   Mason ................. B65D 81/107
                                                206/456
8,777,008 B2 *   7/2014   Hu ....................... B65D 81/051
                                                206/454
(Continued)

FOREIGN PATENT DOCUMENTS

CN    102324569 A    1/2012
CN    208674204 U    3/2019
(Continued)

OTHER PUBLICATIONS

Extended European Search Report for European Application No. 21906916.8, dated Oct. 27, 2023.
(Continued)

*Primary Examiner* — Luan K Bui
(74) *Attorney, Agent, or Firm* — Birch, Stewart, Kolasch & Birch, LLP

(57) ABSTRACT

An inner tray for battery cell transport includes a base plate extending in a longitudinal direction of a pouch-type battery cell; a plurality of insertion plates erected and located on the base plate, the insertion plates being spaced apart to accommodate a lead of the pouch-type battery cell; and at least one buffer pad located on the base plate and extending in the longitudinal direction to support the pouch-type battery cell.

15 Claims, 9 Drawing Sheets

(58) Field of Classification Search
USPC ....... 206/485, 521, 523, 564, 587, 591–593; 429/156
See application file for complete search history.

(56) References Cited

U.S. PATENT DOCUMENTS

| | | | | |
|---|---|---|---|---|
| 8,910,791 | B2* | 12/2014 | Zhao | B65D 25/107 |
| | | | | 206/523 |
| 2002/0108886 | A1 | 8/2002 | Kim | |
| 2011/0056868 | A1* | 3/2011 | Ting | B65D 85/48 |
| | | | | 206/587 |
| 2012/0211398 | A1* | 8/2012 | Hu | B65D 5/5085 |
| | | | | 206/725 |
| 2020/0076023 | A1 | 3/2020 | Puckett | |

FOREIGN PATENT DOCUMENTS

| | | |
|---|---|---|
| EP | 0 621 198 A1 | 10/1994 |
| JP | 2003-142057 A | 5/2003 |
| JP | 2011-40324 A | 2/2011 |
| KR | 10-2002-0066415 A | 8/2002 |
| KR | 10-1127275 B1 | 4/2012 |
| KR | 10-2017-0114852 A | 10/2017 |
| KR | 10-2018-0007964 A | 1/2018 |
| KR | 10-1882647 B1 | 7/2018 |
| KR | 10-2020-0059559 A | 5/2020 |
| WO | WO 2011/113033 A2 | 9/2011 |
| WO | WO 2020/182881 A1 | 8/2020 |

OTHER PUBLICATIONS

International Search Report (PCT/ISA/210) issued in PCT/KR2021/017532, dated Feb. 25, 2022.

* cited by examiner

[FIG. 1]
PRIOR ART
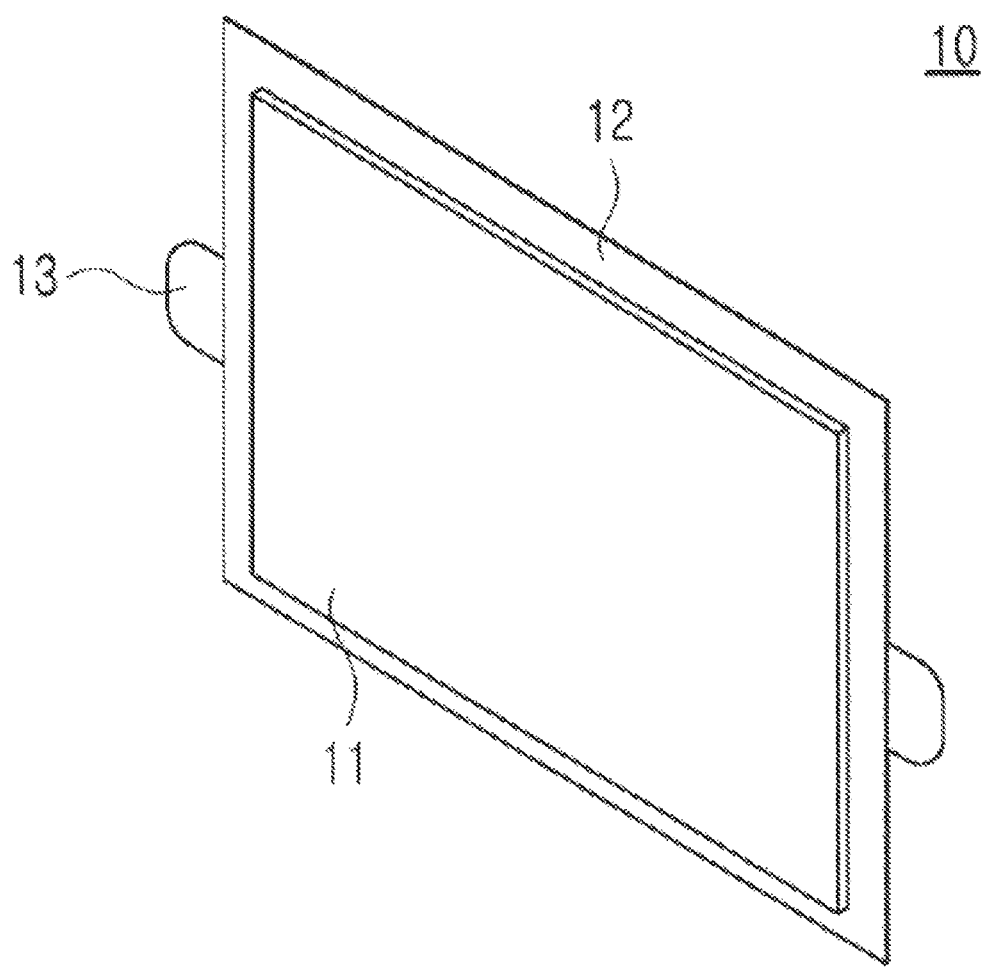

[FIG. 2]
PRIOR ART
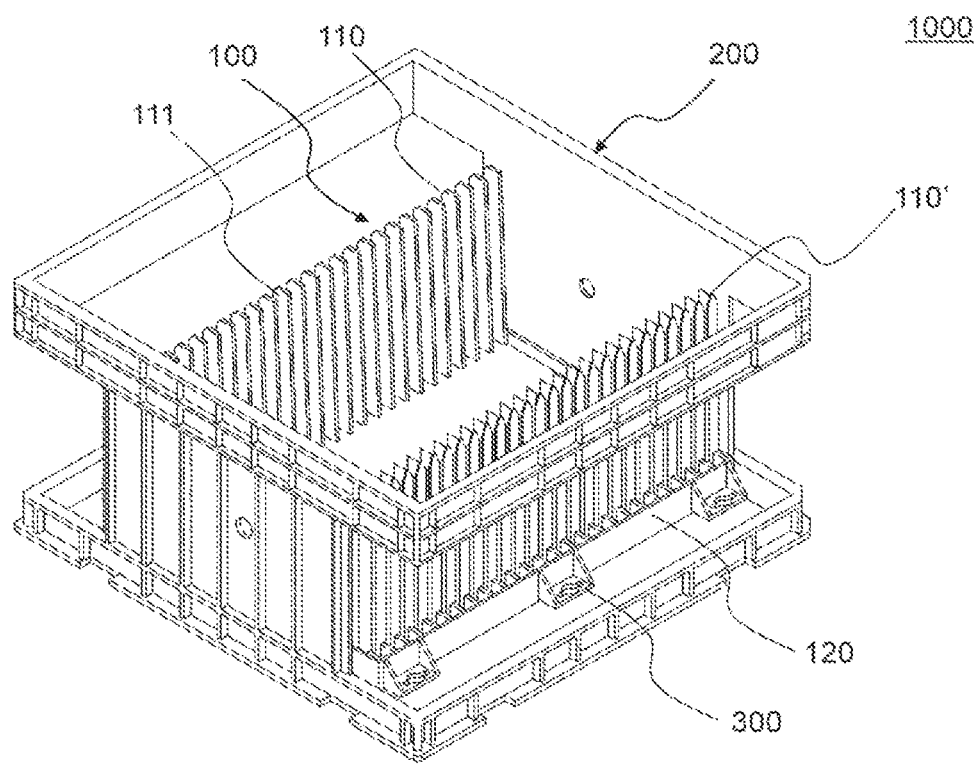

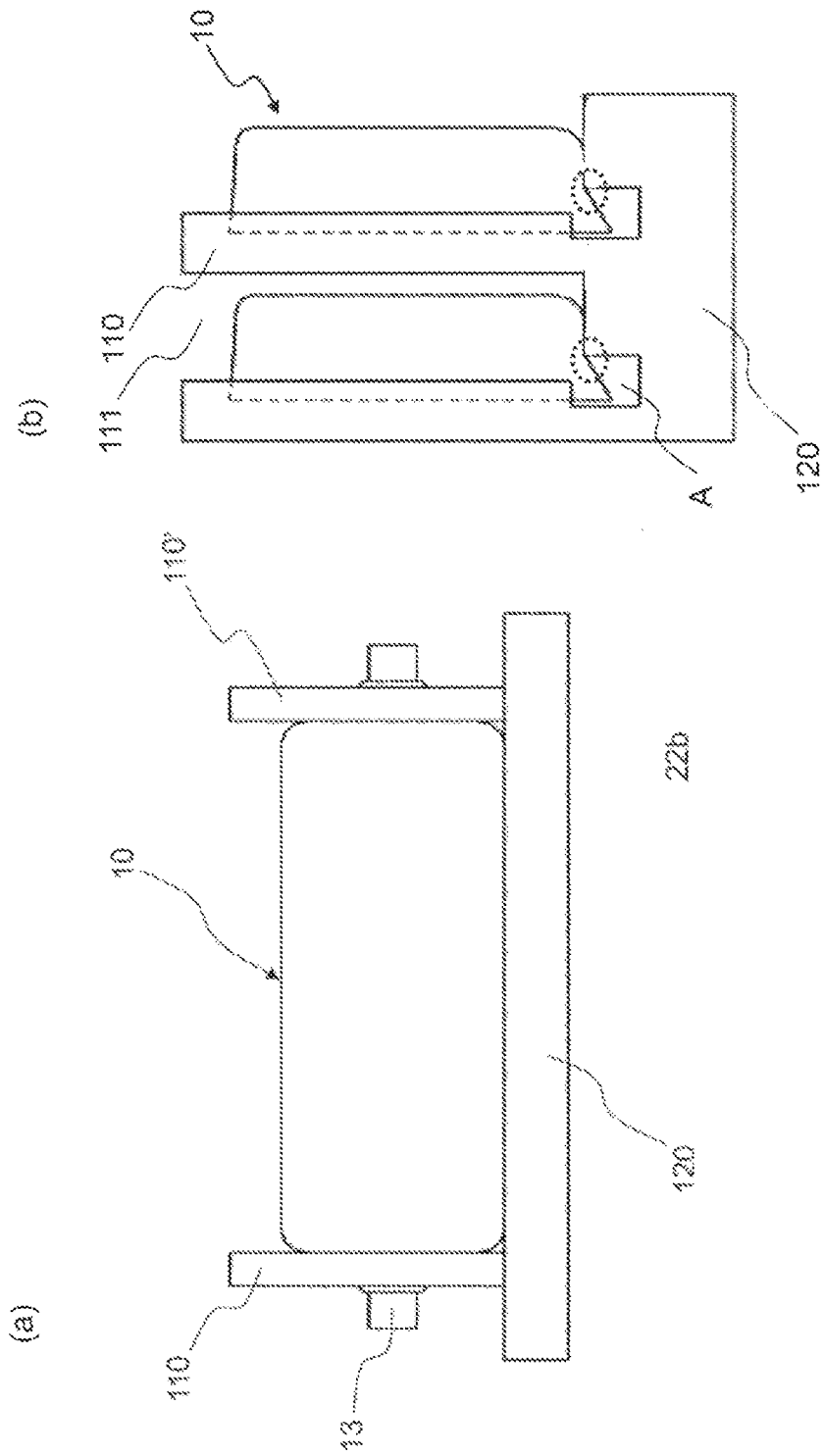

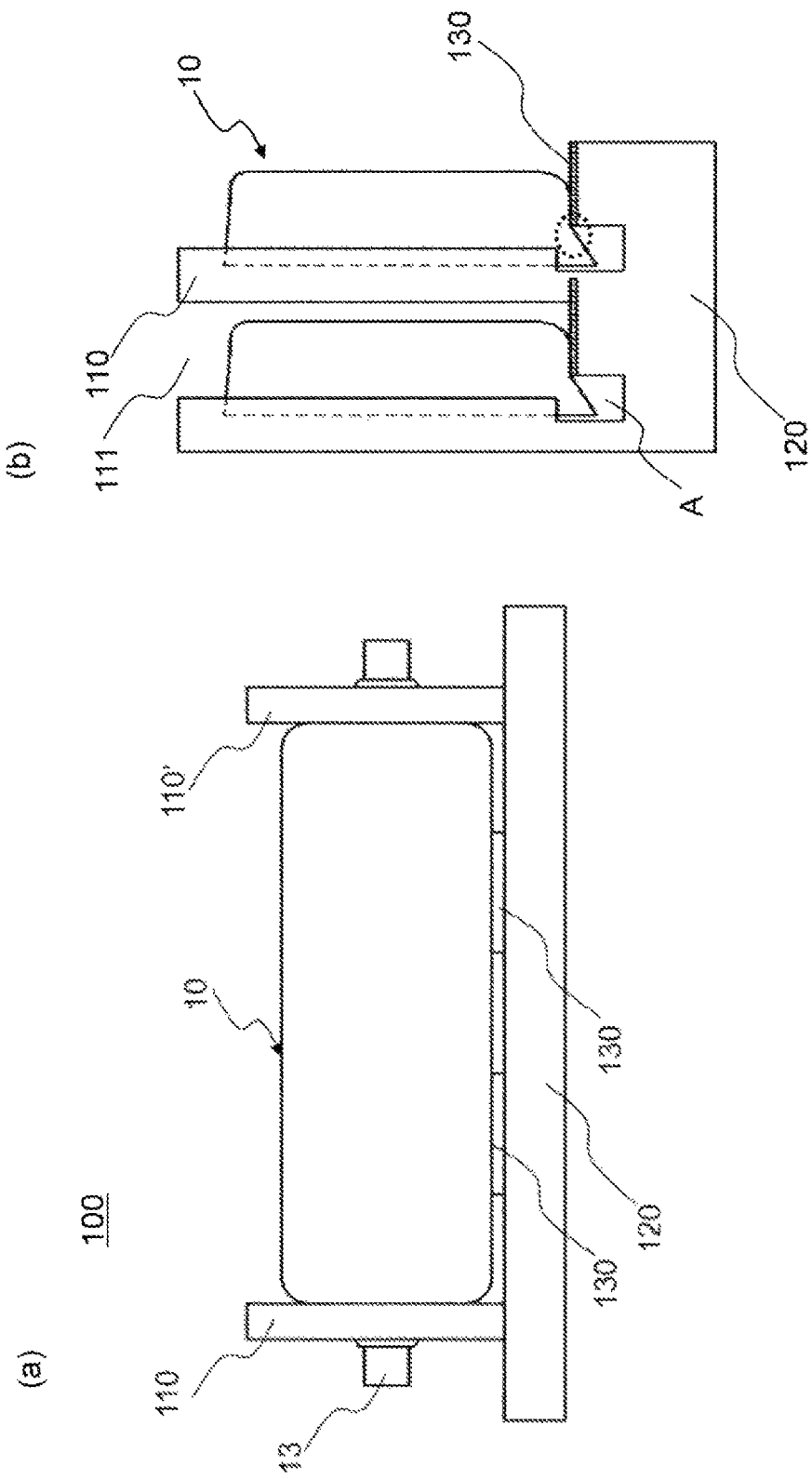

[FIG. 5]
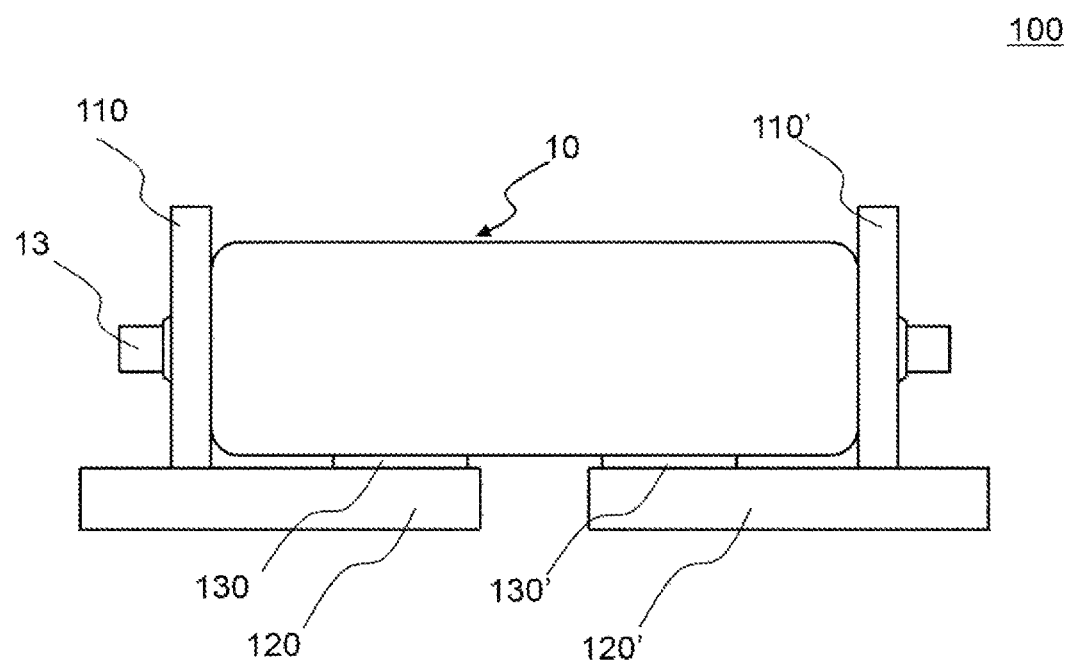

[FIG. 6]
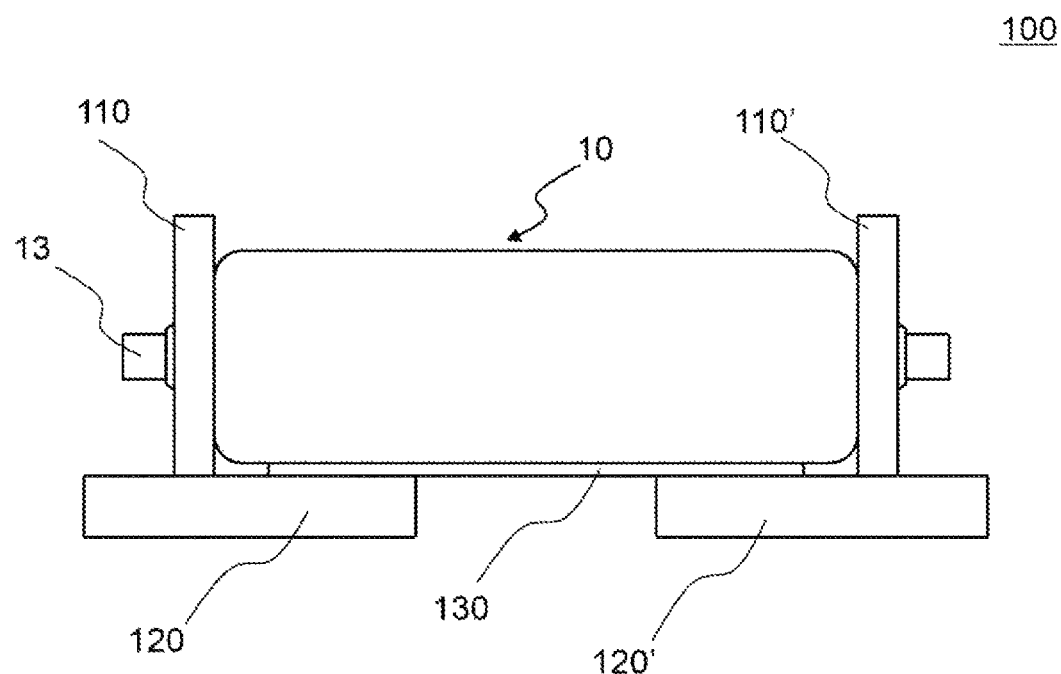

[FIG. 7]
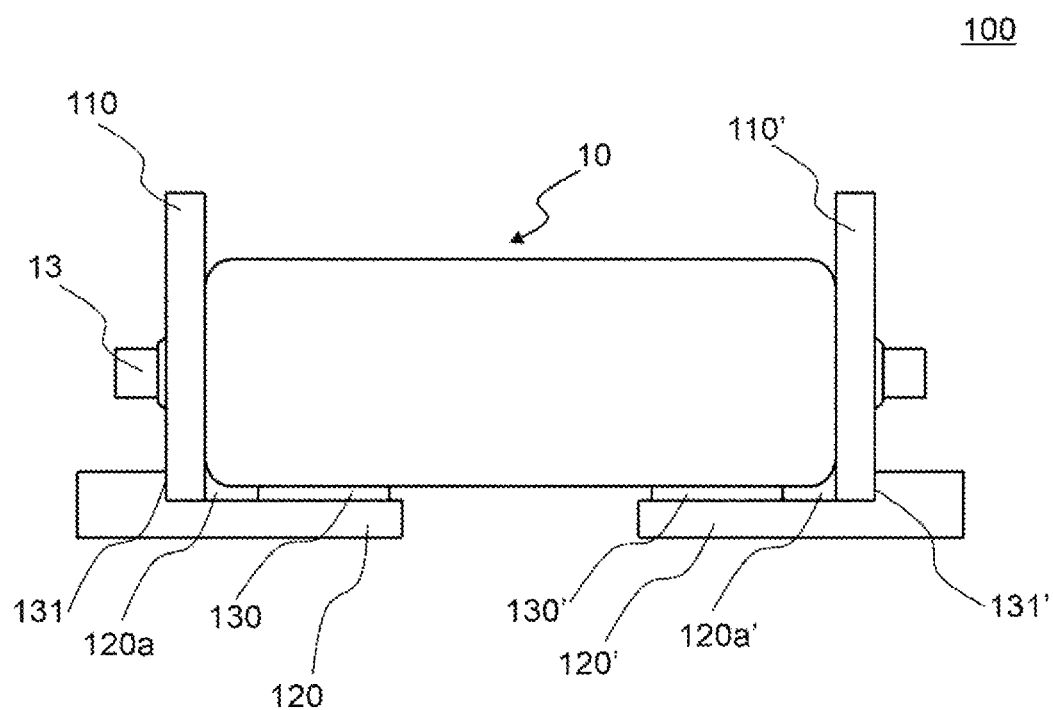

[FIG. 8]
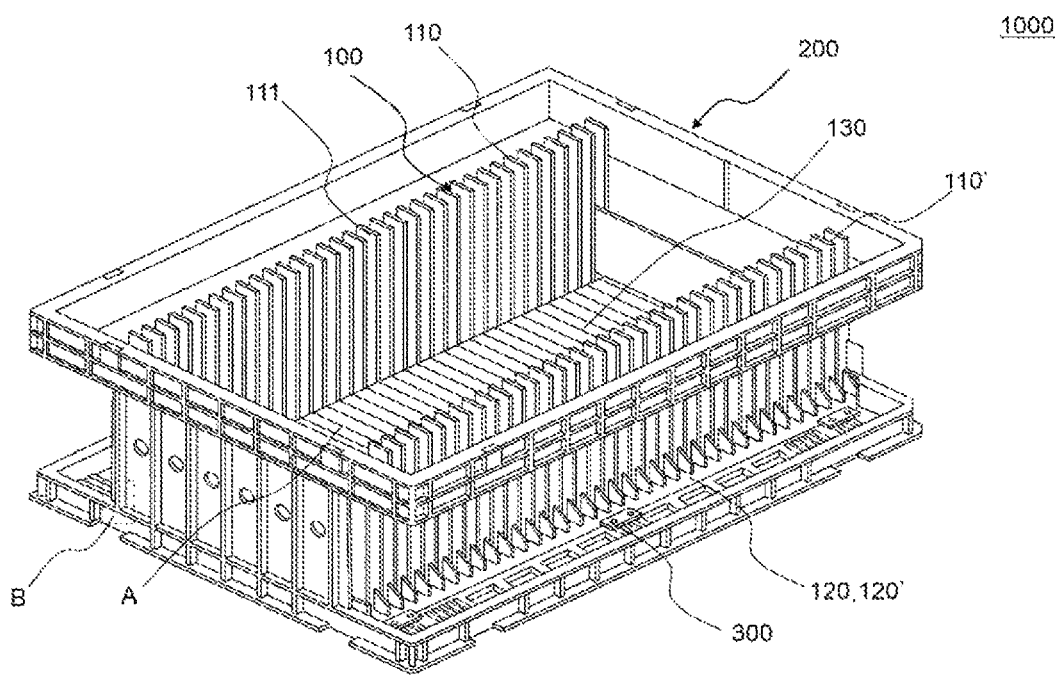

[FIG. 9]
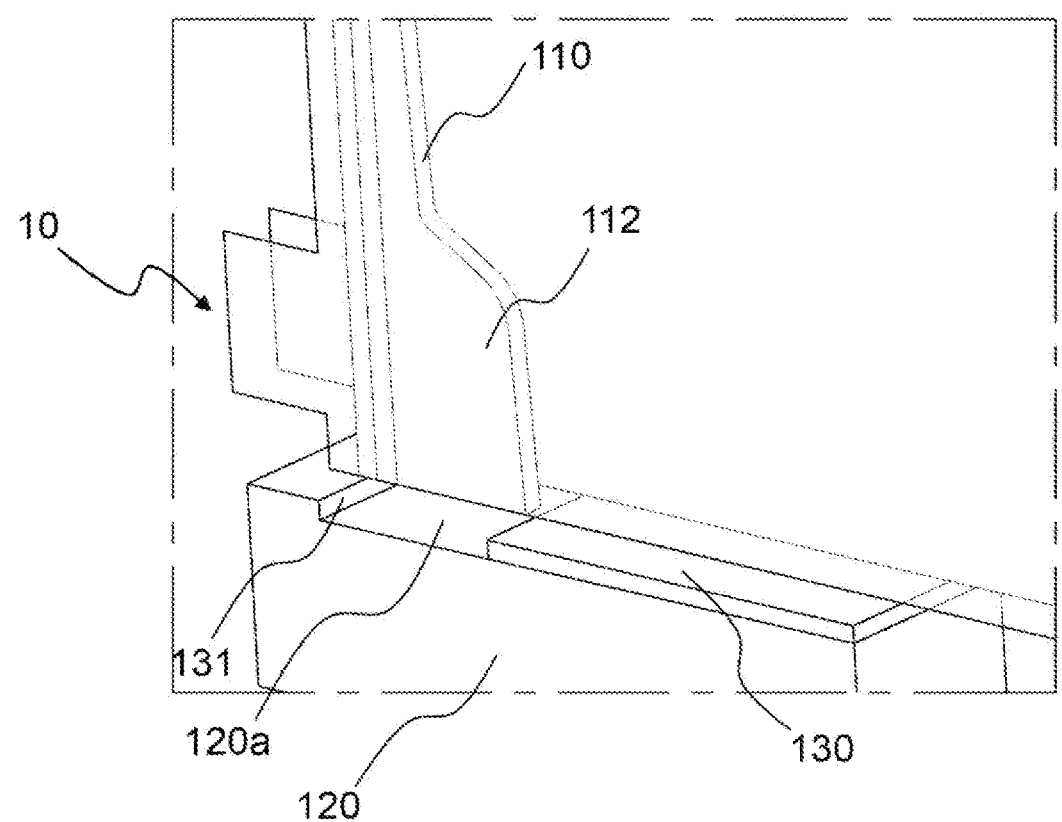

INTERNAL TRAY FOR CONVEYING BATTERY CELLS AND TRAY FOR CONVEYING BATTERY CELL INCLUDING SAME

TECHNICAL FIELD

The present invention relates to an inner tray for battery cell transport. More particularly, the present invention relates to an inner tray for battery cell transport, which is capable of preventing a damage to a pouch-type battery cell by absorbing an impact applied to the battery cell during the transport of the battery cell.

Further, the present invention relates to a battery cell transport tray including the inner tray for battery cell transport.

This application claims the benefit of priority based on Korean Patent Application No. 10-2020-0175324, filed on Dec. 15, 2020, and the entire contents of the Korean patent application are incorporated herein by reference.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Generally, lithium secondary batteries are largely classified into cylindrical batteries, prismatic batteries, and pouch-type batteries according to their appearance, and are also classified into lithium-ion batteries, lithium-ion polymer batteries, and lithium polymer batteries depending on the type of electrolyte solution.

The secondary battery is classified according to the structure of the positive electrode, the negative electrode, and the electrode assembly having the structure of a separator interposed between the positive electrode and the negative electrode. Some examples thereof include a jelly-roll type (wound type) electrode assembly in which positive electrodes and negative electrodes of a long sheet type are wound with a separator interposed therebetween, a stack-folding type electrode assembly of a structure in which unit cells, such as bi-cells or full cells, stacked with positive and negative electrodes of a predetermined unit laminated through a separator, are wound, etc.

In addition, the secondary battery is manufactured by injecting an electrolyte, which is a liquid electrolyte, in a state where the electrode assembly is accommodated in the battery container, and sealing the battery container.

The pouch type battery in the secondary battery can be manufactured in various forms of batteries, so it is used for various electronic machinery products such as automobiles, mobile devices.

FIG. 1 shows a general structure of a pouch-type battery cell. The pouch-type battery cell includes a cell where power is stored, a pouch 12 surrounding the cell, and a lead 13 for charge and discharge. In the battery cell of FIG. 1, the lead 13 is provided at two sides, but the lead 13 may also be provided at only one side (not shown).

In the conventional battery production line, a battery cell transport tray capable of a large amount of battery cells is used as a means for safely transporting battery cells at the time of transport between processes or shipment of finished products. FIG. 2 shows an example of a conventional battery cell transport tray.

As shown, the battery cell transport tray includes an external tray 200, and an inner tray 100 in which battery cells are actually accommodated. The inner tray 100 is accommodated in the external tray 200, and a base plate 120 of the inner tray 100 is fastened to the external tray 200 by a fastening member 300. The inner tray 100 includes a plurality of insertion plates 110 and 110' installed on the base plate 120 of the inner tray 100 in order to allow insertion of the lead of the battery cell 10. The insertion plates 110 and 110' are arranged to face each other at two sides of the base plate 120 so that leads at two sides of the battery cell 10 may be inserted. Further, a slot 111 for battery insertion is formed between two neighboring insertion plates 110. However, the conventional battery cell transport tray has a problem that a crack is generated at the edge portion of the battery cell when transporting a pouch-type battery cell.

FIG. 3 shows a front view (a) and a side view (b) illustrating a state where a pouch-type battery cell has been accommodated in the battery cell transport tray of FIG. 2.

A groove A is formed in the pouch-type battery cell transport tray in a longitudinal direction of the battery cell so that the pouch 12 may be accommodated in the base plate 120 between neighboring insertion plates 110 as shown in (b) of FIG. 3. However, in the case that the direction is changed while transporting the battery cell with the battery cell transport tray, if the battery cell is horizontally moved or the tray is suddenly stopped, the battery cell accommodated in the slot pops up by inertia and falls down to the original place again. In this case, as indicated by dotted circles in (b) of FIG. 3, the edge portion, where the pouch 12 contacts the cell 11 accommodated in the pouch, may bump the edge of the groove A, thereby generating a crack.

Since the inner tray 110 is made of hard plastic, if force is repeatedly applied to the pouch-type battery cell 10 in the slot 111 as described above, a crack may become serious and the battery may be seriously broken.

Therefore, there is a need for a technology capable of preventing the above-described crack in a pouch-type battery cell.

PRIOR ART LITERATURE

Patent Document

Korea Laid-Open Patent Publication No. 10-1882647

DISCLOSURE

Technical Problem

The present invention is believed to solve at least some of the above problems. For example, an aspect of the present invention provides an inner tray for battery cell transport, which is capable of preventing crack generation of a pouch-type battery cell.

Further, the present invention provides a battery cell transport tray including the inner tray.

Technical Solution

An inner tray for battery cell transport for accommodating a pouch-type battery cell of the present invention for solving the above problems includes: a base plate extending in a longitudinal direction of the pouch-type battery cells; a plurality of insertion plates erected and located on the base plate, the insertion plates being spaced apart to accommodate leads of the pouch-type battery cells; and at least one buffer pad located on the base plate and extending in the longitudinal direction to support at least one of the pouch-type battery cell of the plurality of pouch-type battery cells.

In one example, the at least one buffer pad is an elastic member or a foam.

In one example, the at least one buffer pad may be manufactured by a vacuum forming method.

In a specific example, the at least one buffer pad may be formed of at least one of silicon-based resin, urethane-based resin, epoxy-based resin, polyester-based resin, or acrylic-based resin.

In another specific example, the buffer pad may be formed of at least one polymer foam of polyurethane resin, polystyrene resin, polyolefin resin, phenol resin, PVC resin, urea resin, silicone resin, polyimide resin, melamine resin, or PET resin.

In one example, the insertion plates may be located at opposite sides of the base plate to face each other to provide pairs of insertion plates such that a plurality of pairs of insertion plates may be arranged side by side in a thickness direction of the pouch-type battery cells, and slots may be formed between neighboring pairs of insertion plates in the thickness direction of the pouch-type battery cells.

In one example, the at least one buffer pad may be located on the base plate at a position adjacent to one of the insertion plates.

Further, the at least one buffer pad may be a plurality of buffer pads.

In a specific example, a pair of buffer pads of the plurality of buffer pads may be located on the base plate, and each of the pair of buffer pads may be arranged away from a center of the base plate by a predetermined distance and may be arranged to be adjacent to a corresponding one of the insertion plates of the pair of insertion plates.

In one example, the base plate may be provided as a pair of base plates spaced apart in the longitudinal direction, and the insertion plates are located on the pair of base plates.

In another example, the at least one buffer pad may be disposed so at to span between the pair of base plates.

In further another example, step portions may be formed along an external side of each base plate such that a corresponding insertion plate is located between the step portion and the buffer pad, and the step portions may face the at least one buffer pad.

Specifically, a height of the at least one buffer pad may be greater than a height of the step portions.

In another example, a lower portion of each insertion plate includes an ear apportion protruding in the longitudinal direction.

The present invention also relates to a tray for battery cell transport including: the above-described inner tray for battery cell transport; an external tray for battery cell transport, in which the inner tray is accommodated; and a fastening member for fastening the external tray to the inner tray.

Advantageous Effects

According to the present invention, it is possible to prevent generation of a crack which may be generated at an edge of a pouch-type battery cell by installing a buffer pad on a surface where the pouch-type battery cell is mounted.

Therefore, it is possible to effectively transport a battery cell without worrying about crack generation.

BRIEF DESCRIPTION OF THE DRAWINGS

FIG. 1 is a schematic diagram illustrating a form of a conventional pouch-type battery cell.

FIG. 2 is a schematic perspective view of a conventional battery cell transport tray.

FIG. 3 shows a front view and a side view illustrating a state where a pouch-type battery cell has been accommodated in a conventional battery cell transport tray.

FIG. 4 shows a front view and a side view illustrating a state where a pouch-type battery cell has been accommodated in a battery cell transport tray according to an embodiment of the present invention.

FIG. 5 shows a front view illustrating a state where a pouch-type battery cell has been accommodated in a battery cell transport tray according to another embodiment of the present invention.

FIG. 6 shows a front view illustrating a state where a pouch-type battery cell has been accommodated in a battery cell transport tray according to further another embodiment of the present invention.

FIG. 7 shows a front view illustrating a state where a pouch-type battery cell has been accommodated in a battery cell transport tray according to further another embodiment of the present invention.

FIG. 8 is a perspective view of a battery cell transport tray including an inner tray for battery cell transport.

FIG. 9 is a schematic perspective view showing a state in which a pouch-type battery cell has been stored in an inner tray for battery cell transport as a modified example of FIG. 7.

DETAILED DESCRIPTION OF THE PREFERRED EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

An inner tray for battery cell transport for accommodating a pouch-type battery cell of the present invention includes: a base plate which is extended in a longitudinal direction of the pouch-type battery cell; a plurality of insertion plates which are erected and installed on the base plate and into which a lead of the pouch-type battery cell is inserted to be supported; and a buffer pad which is extended and installed on the base plate in a longitudinal direction of the pouch-type battery cell and on which the pouch-type battery cell is mounted.

The present invention is featured in that a buffer pad for absorbing an impact is installed on the base plate of the inner tray for battery cell transport in order to absorb an impact by the movement of a conventional tray for accommodating a pouch-type battery cell, in the slot into which a pouch is inserted. Even if the battery cell pops up or is horizontally moved, the impact may be absorbed by the buffer pad, thereby preventing generation of a crack on the battery cell.

The specific embodiments of the present invention will be described below with reference to the accompanying drawings.

First Embodiment

FIG. 4 shows a front view (a) and a side view (b) illustrating a state where a pouch-type battery cell 10 has been accommodated in a battery cell transport tray 100 according to an embodiment of the present invention.

As shown in FIG. 4, the feature of the present invention is in that a buffer pad 130 is installed and extended on a base plate 120 in a longitudinal direction of the battery cell. If the pouch-type battery cell 10 is inserted into the slot 111 of the insertion plate 110, the buffer pad 130 absorbs the impact even in the case that the battery cell pops up and falls again as illustrated in (b) of FIG. 4, thereby preventing generation of a crack at the edge portion of the battery cell 10.

Herein, the structure of the base plate 120 and the insertion plate 110 may be the same as the conventional structure as described in FIG. 2. Namely, the base plate 120 is extended in a longitudinal direction of the battery cell. A plurality of insertion plates 110 and 110' are erected and installed on the base plate. The insertion plates 110 and 110' are installed to form a pair facing each other at two sides on the base plate as shown in (a) of FIG. 4. In the case of the present example, the insertion plates 110 and 110' are installed to accommodate a pouch-type battery cell 10 having leads 13 at two sides. Further, a plurality of insertion plates 110 and 110' are arranged side by side in a thickness direction of the battery cell, and a slot 111, into which the lead of the battery cell is inserted, is formed between the neighboring insertion plates 110 and 110'. The above-described buffer pad 130 is installed on the base plate 120 of the portion where the slot has been formed. The buffer pad 130 is extended and installed in a longitudinal direction of the battery cell (see (a) of FIG. 4). As illustrated in (b) of FIG. 4, since the buffer pad 130 contacts the edge portion of the battery cell, the edge portion of the base plate at the lower portion of the buffer pad is prevented from contacting the battery cell.

The buffer pad 130 is preferably installed on the base plate 120 at a position adjacent to the insertion plates 110 and 110'. It is because it is difficult to stably support the two side portions of the battery cell if the buffer pad 130 is installed on the base plate 120 in a position too far away from the insertion plates 110 and 110'. Further, in order to stably support the bottom portion of the battery cell, the buffer pad 130 should be extended in a longitudinal direction of the battery cell 10 by a predetermined or greater length.

Further, the buffer pad 120 may be composed of a single pad which is extended in a longitudinal direction of the battery cell, but as illustrated in (a) of FIG. 4, a plurality of buffer pads may be installed in a manner that they are spaced apart from each other in a longitudinal direction of the pouch-type battery cell. In a specific example, a pair of buffer pads may be installed on the buffer pad on right and left sides. In this form, it is possible to stably support the lower portion of both sides of the battery cell while preventing consumption of the material of the buffer member. In this case, each of the pair of buffer pads 130 may be arranged away from a center of the base plate by a predetermined distance and may be arranged to be adjacent to each of insertion plates of two sides of the base plate 110 and 110'.

Since the buffer pad 130 should absorb an impact by the movement of the battery cell, the buffer pad 130 should be made of a material which is softer than that of the inner tray 100 or the base plate 120. For example, the buffer pad may be an elastic member or a foam. For example, materials such as rubber with elasticity can be used. Alternatively, a plastic resin of a polymer matrix with elasticity may also be used. In such an example, the buffer pad may be formed of at least one selected from the group consisting of silicon-based resin, urethane-based resin, epoxy-based resin, polyester-based resin, and acrylic-based resin.

The buffer pad may be made of at least one selected from the group consisting of polyurethane resin, polystyrene resin, polyolefin resin, phenol resin, PVC resin, urea resin, silicone resin, polyimide resin, melamine resin, and PET resin.

The buffer pad of the present invention may be made of any soft material capable of absorbing an impact of the battery cell. For example, a porous, expandable complex material may be used.

It is preferable that the buffer pad is manufactured by a vacuum forming method which is appropriate for diversified small-quantity production. In this way, the shape of the buffer pad may be modified in various manners to thereby be applied to the tray for battery cell transport. It is possible to reduce the weight by forming an appropriate weight-reducing unit.

Second Embodiment

FIG. 5 shows a front view illustrating a state where a pouch-type battery cell has been accommodated in a battery cell transport tray according to a second embodiment of the present invention.

In the present example, a pair of base plates 120 and 120', which are arranged to be spaced apart in a longitudinal direction of the pouch-type battery cell, are provided. If the base plate of FIG. 4 is an integrated type, the base plate of FIG. 5 is a separate type. In the present embodiment, the insertion plates 110 and 110' and the buffer pads 130 and 130' are installed in base plates 120 and 120', respectively.

The buffer pad is installed to be adjacent to the insertion plate and is installed on the base plate in a manner that is extended by a predetermined length in a longitudinal direction of the battery cell in order to stably support the load of the battery cell.

Third Embodiment

FIG. 6 shows a front view illustrating a state where a pouch-type battery cell has been accommodated in a battery cell transport tray according to a third embodiment of the present invention.

In the present embodiment, a pair of base plates 120 and 120', which are arranged to be spaced apart in a longitudinal direction of the pouch-type battery cell, are provided. The difference from the second embodiment is in that the buffer pad 130 is disposed so as to span between a pair of base plates 120 and 120' and is extended toward the insertion plates 110 and 110' by a predetermined length. When the buffer pad is fixedly installed on the buffer pad, the buffer pad 130 plays a role of fastening the pair of base plates and accordingly also plays a role of increasing the rigidity of the inner tray for battery cell transport.

Fourth Embodiment

FIG. 7 shows a front view illustrating a state where a pouch-type battery cell has been accommodated in a battery cell transport tray according to a fourth embodiment of the present invention.

In the present example, a pair of base plates 120 and 120', which are arranged to be spaced apart in a longitudinal direction of the pouch-type battery cell, are provided as in the embodiment of FIG. 5. The difference with FIG. 5 is in that a step portion 131 is formed along an external side of a portion where the insertion plate has been installed as a position of two ends of the base plate facing the buffer pad 130. Namely, as the step portion 131 is formed on the base plate 120 of the external end of the insertion plate, a space for accommodating the pouch portion at the time of accommodating a battery cell is generated between the step portions 131 and 131' and the buffer members 130 and 130'. Although not clearly illustrated in FIG. 7, the pouch-type battery cell includes a pouch portion around the cell in addition to the cell portion, and accordingly, if a step portion is formed as described above, the pouch portion may be conveniently accommodated in a space between the step portion and the buffer member. Further, if there are the above-described spaces, the possibility that the edge portion of the pouch-type battery cell contacts the base plate significantly decreases. Namely, the possibility that the edge portion of the battery cell contacts the base plate decreases by lifting the battery cell by the buffer pads 130 and 130', and the possibility that the edge portion of the battery cell may receive an impact may be further reduced by forming the step portions 131 and 131'. At this time, the height of the buffer pads 130 and 130' may be set to be the same as the height of the step portions 131 and 131'. However, it is preferable for the height of the buffer pad to be set to be greater than the height of the step portion in order to prevent an impact on the edge portion of two sides of the battery cell.

FIG. 8 is a perspective view of a battery cell transport tray 1000 including an inner tray 100 for battery cell transport.

As illustrated in FIG. 8, the inner tray 100 for battery cell transport of the present invention includes a plurality of insertion plates 110 and 110' at both sides of the base plates 120 and 120'. Further, a slot 111 for accommodating a battery cell is formed between the insertion plates. Buffer pads 130 and 130' capable of absorbing an impact are extended and installed on the base plates 120 and 120' of the insertion plate in a longitudinal direction of the battery cell. Further, a plurality of buffer pads 130 and 130' are also installed according to the number of slots of the insertion plate in the width direction of the battery cell.

As illustrated in FIG. 8, the present invention provides a battery cell transport tray 1000 including the inner tray 100. Namely, if the inner tray 110 is accommodated in the external tray 200, and the external tray is fastened to the inner tray by the fastening member 300, the tray for battery cell transport is completed as a whole. In the present example, the base plates 120 and 120' of the inner tray are fastened to the external tray 200 by the fastening member 300, but in some cases, the rear portion of the insertion plates 110 and 110' may be fastened to the side member of the external tray 200 by the fastening member 300.

The external tray 200 is made of hard plastic resin and spatially separates a region where the battery cell is mounted from an external side and has an open top to take out and mount the battery cell. Further, at least part of the side plate is opened for assembly or disassembly of the inner tray 100 or insertion plates 110 and 100' accommodated therein. A plurality of ribs are formed at necessary places to reinforce the rigidity to the surface elements of the external tray 200, and weight-lightening is done in a range that does not decrease the rigidity.

FIG. 9 is a schematic perspective view showing a state in which a pouch-type battery cell has been stored in an inner tray for battery cell transport as a modified example of FIG. 7. FIG. 9 is a perspective view of a portion corresponding to B portion of the lower left of FIG. 8, and the structure of the insertion plate 110 is different from that of FIGS. 7 and 8.

In FIG. 9, a step portion 131 is formed at the external side of the insertion plate as two ends of the base plate as in the embodiment of FIG. 7. Further, as a space 120a is formed between the step portion 131 and the buffer pad 130, a space for accommodating a pouch portion is provided as described above. Further, the space prevents the lower end of the pouch-type battery cell from contacting the base plate 120.

In the present modified example, an ear portion 112, in which the insertion plate 110 protrudes on the lower portion in a longitudinal direction of the battery cell (namely, in an inner side direction of the inner tray), is formed. In this form, when a battery cell is accommodated between the insertion plates, the ear portion 112 may stably support the battery cell.

At this time, the buffer pad 130 may be installed on the base plate to be adjacent to the ear portion 112 of the insertion plate to thereby support the battery cell.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

10: pouch-type battery cell
100: inner tray
110, 110': insertion plate
111: slot
112: ear portion
120, 120': base plate
120a, 120a': space
130, 130': buffer pad
131, 131': step portion
A: groove
200: external tray
300: fastening member
1000: tray

The invention claimed is:

1. An inner tray for battery cell transport, the inner tray being mountable in an external tray to accommodate a plurality of pouch-type battery cells, the inner tray comprising:
 a base plate extending in a longitudinal direction of the pouch-type battery cells;
 a plurality of insertion plates erected and located on the base plate, the insertion plates being spaced apart to accommodate leads of the pouch-type battery cells; and
 at least one buffer pad located on the base plate and extending in the longitudinal direction to support at least one of pouch-type battery cell of the plurality of the pouch-type battery cells, wherein step portions are located at opposite sides of the base plate such that the insertion plates are located between the step portions, the step portions facing the buffer pad.

2. The inner tray of claim 1, wherein the at least one buffer pad is an elastic member or a foam.

3. The inner tray of claim 1, wherein the at least one buffer pad is manufactured by a vacuum forming method.

4. The inner tray of claim 1, wherein the at least one buffer pad is formed of at least one of silicon-based resin, urethane-based resin, epoxy-based resin, polyester-based resin, or acrylic-based resin.

5. The inner tray of claim 2, wherein the at least one buffer pad is formed of at least one polymer foam of polyurethane resin, polystyrene resin, polyolefin resin, phenol resin, PVC resin, urea resin, silicone resin, polyimide resin, melamine resin, or PET resin.

6. The inner tray of claim 1, wherein the insertion plates are located at opposite sides of the base plate to face each other to provide pairs of insertion plates such that a plurality of pairs of insertion plates are arranged side by side in a thickness direction of the pouch-type battery cells, and slots are formed between neighboring pairs of insertion plates in the thickness direction of the pouch-type battery cells.

7. The inner tray of claim 6, wherein the at least one buffer pad is located on the base plate at a position adjacent to one of the insertion plates.

8. The inner tray of claim 6, wherein the at least one buffer pad is a plurality of buffer pads.

9. The inner tray of claim 8, wherein a pair of buffer pads of the plurality of buffer pads are located on the base plate, and each of the pair of buffer pads is arranged away from a center of the base plate by a predetermined distance and is arranged to be adjacent to a corresponding one of the insertion plates of the pair of insertion plates.

10. The inner tray of claim 2, wherein the base plate is provided as a pair of base plates spaced apart in the longitudinal direction, and the insertion plates are located on the pair of base plates.

11. The inner tray of claim 1, wherein a height of the at least one buffer pad is greater than a height of the step portions.

12. The inner tray of claim 6, wherein a lower portion of each insertion plate includes an ear portion protruding in the longitudinal direction.

13. The inner tray of claim 12, wherein the at least one buffer pad is located on the base plate adjacent to the ear portions of the pairs of insertion plates.

14. A tray for battery cell transport, the tray comprising:
the inner tray for battery cell transport of claim 1;
an external tray for battery cell transport, in which the inner tray is accommodated; and
a fastening member for fastening the external tray to the inner tray.

15. An inner tray for battery cell transport, the inner tray being mountable in an external tray to accommodate a plurality of pouch-type battery cells, the inner tray comprising:
a base plate extending in a longitudinal direction of the pouch-type battery cells;
a plurality of insertion plates erected and located on the base plate, the insertion plates being spaced apart to accommodate leads of the pouch-type battery cells; and
at least one buffer pad located on the base plate and extending in the longitudinal direction to support at least one pouch-type battery cell of the plurality of the pouch-type battery cells,
wherein the base plate is provided as a pair of base plates spaced apart in the longitudinal direction, and the insertion plates are located on the pair of base plates, and
wherein the at least one buffer pad is disposed so as to span between the pair of base plates.

* * * * *